US011277007B2

(12) United States Patent
Umeda et al.

(10) Patent No.: US 11,277,007 B2
(45) Date of Patent: Mar. 15, 2022

(54) POWER CONVERSION DEVICE, POWER SYSTEM AND METHOD OF SUPPRESSING REACTIVE POWER IN POWER SYSTEM

(71) Applicant: TOSHIBA MITSUBISHI-ELECTRIC INDUSTRIAL SYSTEMS CORPORATION, Chuo-ku (JP)

(72) Inventors: Katsuya Umeda, Tokyo (JP); Tsuguhiro Tanaka, Tokyo (JP); Masahiro Kinoshita, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 247 days.

(21) Appl. No.: 16/609,601

(22) PCT Filed: Jul. 10, 2017

(86) PCT No.: PCT/JP2017/025170
§ 371 (c)(1),
(2) Date: Oct. 30, 2019

(87) PCT Pub. No.: WO2019/012588
PCT Pub. Date: Jan. 17, 2019

(65) Prior Publication Data
US 2020/0153247 A1    May 14, 2020

(51) Int. Cl.
*H02J 3/18* (2006.01)
*H02J 3/38* (2006.01)
*H02J 3/46* (2006.01)

(52) U.S. Cl.
CPC ............ *H02J 3/18* (2013.01); *H02J 3/381* (2013.01); *H02J 3/466* (2020.01); *H02J 2300/24* (2020.01)

(58) Field of Classification Search
CPC .... H02J 3/16; H02J 3/18; H02J 3/1821; H02J 3/1835; H02J 3/1864; H02J 3/38–388; H02J 3/466; H02J 2300/24; H02M 1/126
See application file for complete search history.

(56) References Cited

U.S. PATENT DOCUMENTS 9,667,128 B2 * 5/2017 Patel ..................... H02M 1/126
2010/0208501 A1   8/2010 Matan et al.
(Continued)

FOREIGN PATENT DOCUMENTS

JP    56-88627 A    7/1981
JP    59-175340 A   10/1984
(Continued)

OTHER PUBLICATIONS

Indian Office Action dated Mar. 22, 2021 in Indian Patent Application No. 201917047619 (with English translation), 6 pages.
(Continued)

*Primary Examiner* — Fred E Finch, III
(74) *Attorney, Agent, or Firm* — Oblon, McClelland, Maier & Neustadt, L.L.P.

(57) ABSTRACT

A power system includes an AC power supply, an AC filter circuit, an AC circuit breaker, and a first switch. The AC filter circuit includes an inductor having one end connected in series to an output end of the AC power supply, and a capacitor having one end receiving a voltage at another end of the inductor. The AC circuit breaker exists between the other end of the inductor and an electric power grid. The first switch switches a state between the one end of the capacitor and a wire connecting the other end of the inductor to the AC circuit breaker, between a connected state and a disconnected state. The AC power supply may be a generator and include a generator control unit controlling the generator. The generator control unit may turn off the first switch when
(Continued)

the AC power supply operates in a predetermined standby mode.

8 Claims, 7 Drawing Sheets

(56) References Cited

U.S. PATENT DOCUMENTS

| | | | | |
|---|---|---|---|---|
| 2011/0309683 | A1* | 12/2011 | Nielsen | H02J 3/00125 |
| | | | | 307/84 |
| 2019/0376489 | A1* | 12/2019 | Holliday | H02P 9/006 |
| 2021/0044110 | A1* | 2/2021 | Shi | H02M 7/539 |

FOREIGN PATENT DOCUMENTS

| | | |
|---|---|---|
| JP | 59-1831 46 U | 12/1984 |
| JP | 2009-171652 A | 7/2009 |

OTHER PUBLICATIONS

Japanese Office Action dated Sep. 1, 2020 in Japanese Patent Application No. 2019-529341 (with unedited computer generated English translation), 6 pages.

International Search Report dated Aug. 1, 2017 in PCT/JP2017/025170 filed on Jul. 10, 2017.

International Preliminary Report on Patentability and Written Opinion dated Jan. 23, 2020 in PCT/JP2017/025170 (submitting English translation only).

Extended European Search Report dated Jan. 15, 2021 in European Patent Application No. 17917883.5, 9 pages.

* cited by examiner

POWER CONVERSION DEVICE, POWER SYSTEM AND METHOD OF SUPPRESSING REACTIVE POWER IN POWER SYSTEM

FIELD

The present invention relates to a power conditioner, a power system, and a method for suppressing reactive power in a power system.

BACKGROUND

Conventionally, as disclosed in, for example, Japanese Patent Application Laid-Open No. 2009-171652, a power system for performing grid connection is known. The conventional power system includes a power conversion device connected to an electric power gird, an AC capacitor for a filter provided between the power system and the power conversion device, and a secondary battery for supplying DC power to the power conversion device. In such a system configuration, when the power conversion device is in the operation stop state, the power system and the AC capacitor for the filter are connected to each other, and this causes reactive power flowing into and out of the AC capacitor. In this respect, in the conventional power system described above, a DC circuit breaker is provided between the secondary battery and the power conversion device. In the above-mentioned conventional power system, when it is necessary to suppress the reactive power that flows into and out of the AC capacitors, the DC circuit breaker is placed in an open state, i.e., a disconnected state, and the power conversion device is controlled so as to reduce the reactive current that flows from the electric power grid into the power conversion device.

CITATION LIST

Patent Literature

[PTL 1] JP 2009-171652 A

SUMMARY

Technical Problem

In the conventional power conversion device described above, the DC circuit breaker is in a disconnected state at the time of suppressing reactive power, but the addition of the DC circuit breaker is necessary. On the other hand, an AC circuit breaker is usually provided between the power conversion device and the electric power grid Therefore, it may be considered to temporarily switch the AC circuit breaker to the disconnected state in order to suppress the reactive power. However, the AC circuit breaker is provided mainly for the purpose of shutting off a large current flowing between the electric power grid and the power conversion device. Although the AC circuit breaker is provided with a sufficiently high circuit breaking capacity, on the other hand, since the AC circuit breaker is mainly used for shutting off the excessively large current or the like, the AC circuit breaker is not frequently switched between open and close. If the AC circuit breaker is operated in order to suppress reactive power, the frequency of switching of the AC circuit breaker is greatly increased, and the AC circuit breaker reaches the machine life at an early stage. As a result, there has been a problem that it is necessary to replace the AC circuit breaker at an early stage or the like.

The present invention has been made to solve the above-mentioned problems, and an object thereof is to provide a power system capable of suppressing reactive power while suppressing a load on an AC circuit breaker.

Solution to Problem

A power system according to the present invention includes: an AC power supply for outputting AC power; an AC filter circuit including an inductor having one end connected in series to an output end of the AC power supply and a capacitor having one end receiving a voltage of another end of the inductor; an AC circuit breaker provided between the other end of the inductor and an electric power grid; a first switch provided between the one end of the capacitor and a wiring connecting the other end of the inductor and the AC circuit breaker.

A power conditioner according to the present invention includes: an inverter circuit for converting a DC voltage from a DC power supply into an AC voltage; an AC filter circuit including an inductor having one end connected in series to an output end of the inverter circuit and a capacitor having one end receiving a voltage of another end of the inductor; and a first switch connecting the one end of the capacitor to a wiring connecting the other end of the inductor and an AC circuit breaker provided between the other end of the inductor and an electric power grid, and the first switch being connected between the wiring and the one end of the capacitor.

A method for reactive power suppression in a power system according to the present invention includes: providing a power system including an AC power supply, an AC filter circuit including an inductor having one end connected in series to an output end of the AC power supply and a capacitor having one end receiving a voltage of another end of the inductor, and an AC circuit breaker provided between the other end of the inductor and an electric power system; and switching an electrical connection between the wiring connecting the other end of the inductor and the AC circuit breaker, and the one end of the capacitor between a connected state and a disconnected state using a switch.

Advantageous Effects of Invention

According to the present invention, even if the AC circuit breaker is not operated, it is possible to suppress the reactive power from entering and leaving the AC filter circuit by turning off the first switch as necessary.

DESCRIPTION OF EMBODIMENTS

Embodiment 1

Figure 1:
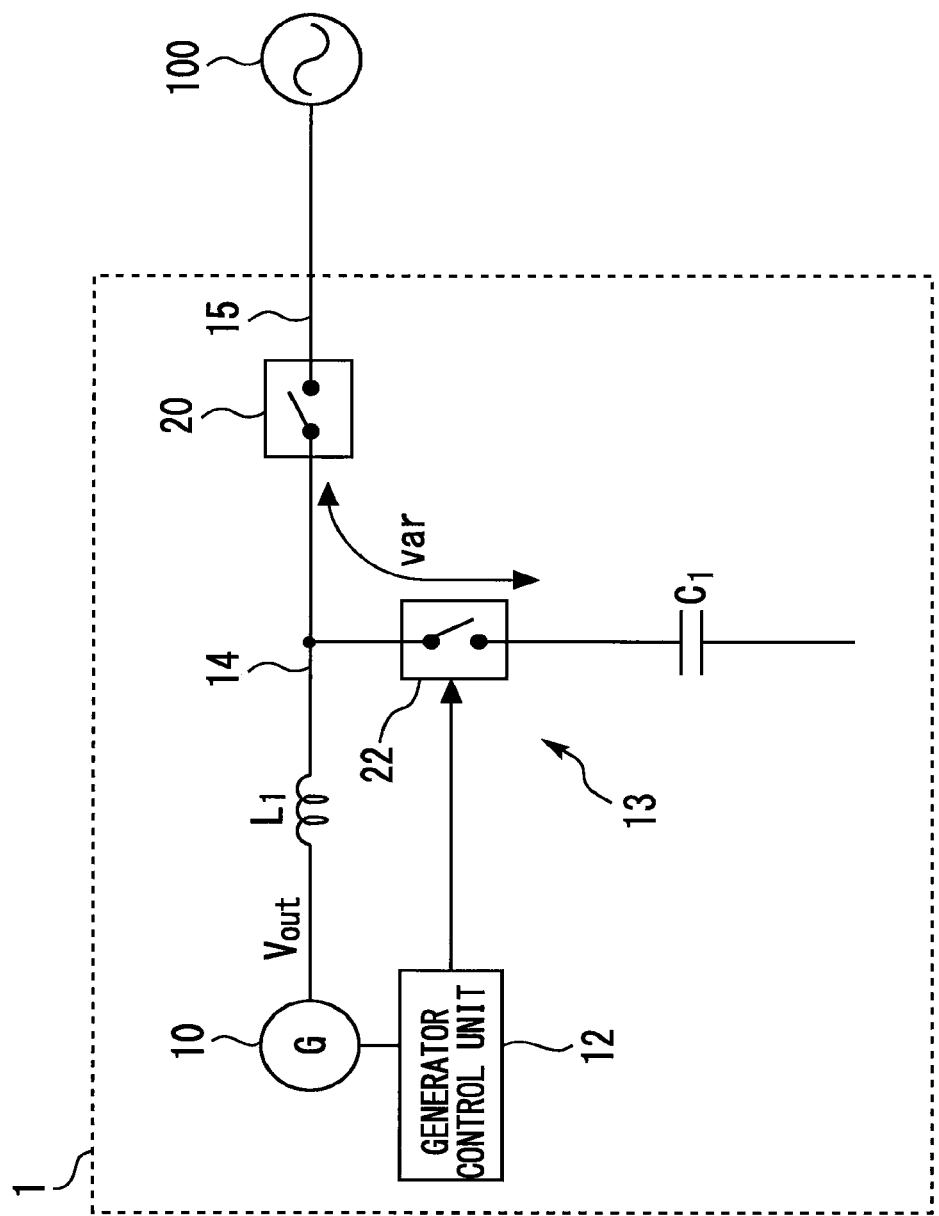
FIG. 1 is a circuit diagram showing a power system according to an Embodiment 1 of the present invention.

FIG. 1 is a circuit diagram showing a power system 1 according to an Embodiment 1 of the present invention. The power system 1 includes an AC generator 10 as an AC power supply, a generator control unit 12, an AC filter circuit 13, an AC circuit breaker 20, and a first switch 22. The power system 1 is connected to an electric power grid 100, and these perform a grid connection operation. The generator control unit 12 controls the AC generator 10 and the first switch 22.

The AC generator 10 according to the Embodiment 1 is a generator configured to output AC power. The AC generator 10 may be a combination of a DC power supply and a DC/AC conversion device. That is, the AC generator 10 may be a photovoltaic generator including a photovoltaic cell array and an inverter circuit. Alternatively, instead of the AC generator 10, a power supply system including a battery and an inverter circuit may be used as an AC power supply. The AC generator 10 may be a wind turbine generator or the like, and since various known generators can be applied, detailed description thereof is omitted. A specific example in the case where the AC generator 10 is a photovoltaic generator will be described later in Embodiment 2.

The AC filter circuit 13 includes an inductor L1 and a capacitor C1. One end of the inductor L1 is connected in series to the output end of the AC generator 10. The voltage at the other end of the inductor L1 is applied to one end of the capacitor C1. The other end of the capacitor C1 may or may not be grounded depending on a specific circuit configuration. Therefore, in the circuit diagram of FIG. 1, the presence or absence of the ground is not specified with respect to the other end of the capacitor C1. The capacitor C1 may be a film capacitor or an oil capacitor.

The AC circuit breaker 20 is provided between the other end of the inductor L1 and the electric power grid 100. A wiring 14 connects the other end of the inductor L1 to the AC circuit breaker 20. A wiring 15 connects the AC circuit breaker 20 and the electric power grid 100. The first switch 22 is interposed between the wiring 14 and the one end of the capacitor C1. The first switch 22 can switch a state between the wiring 14 and the one end of the capacitor C1 between a connected state and a disconnected state. Terms in Embodiment 1 will now be described. In the "connected state", the first switch 22 is turned on, an electric path is conducted, and a current flows through the first switch 22. In the "disconnected state", the first switch 22 is turned off, the electrical path is cut off, and no current flows therein. The disconnected state may also be referred to as an open state. The same applies to Embodiments 2 to 4.

The first switch 22 may be a switch having a smaller rated current than that of the AC circuit breaker 20. The reactive power flowing into and out of the capacitor C1 of the AC filter circuit 13 is smaller than the power handled by the AC circuit breaker 20. Therefore, a switch having a smaller allowable current amount than that of the AC circuit breaker 20 may be used as the first switch 22. When the AC generator 10 is a generator, it may be sufficient for the first switch 22 to be able to cut off power of about 10% of a power supply capacity. As a specific example of the specification, for example, the rated current of the AC circuit breaker 20 may be 89% to 91%, and the rated current of the first switch 22 may be 9% to 11%.

The AC circuit breaker 20 may be a low pressure air AC circuit breaker (Air Circuit Breaker). The ACB is mainly used to shut off and open/close a low-voltage large current. The ACB operates on an arc extinguishing principle in which arc is extinguished by introducing an arc into a gap in an arc extinguishing chamber formed by superposing a plurality of magnetic arc extinguishing plates.

The first switch 22 may be a Molded Case Circuit Breaker (MCCB). Since the machine life of the MCCB is much longer than that of the ACB, the need for equipment replacement can be reduced by using the MCCB as the first switch 22. Also, since the MCCB is cheaper than the ACB, costs can be reduced.

The generator control unit 12 makes the first switch 22 the disconnected state when the AC generator 10 is operated in a predetermined standby mode. The first switch 22 can become the disconnected state reliably in the standby mode, and this can reliably suppress an entry of the reactive power to the capacitor C1 and an exit of the reactive power from the capacitor C1. The "standby mode" means a state in which the AC generator 10 is connected to the electric power grid and stands by. The standby mode includes, for example, the following first to third specific examples. The first specific example is a case where a voltage abnormality or the like occurs in the AC generator 10 and the operation of the AC generator 10 is stopped. The second specific example is a case where the active power command value from the high-order monitoring device managing the power system 1 is zero. The third specific example is a case where the AC generator 10 fails.

According to the Embodiment 1, by turning off the first switch 22 as necessary, it is possible to suppress the reactive power from entering and leaving the capacitor C1. Without operating the AC circuit breaker 20, the inflow and outflow of the reactive power can be suppressed.

More specifically, the reactive power flowing into or from the capacitor C1 causes a voltage fluctuation of the electric power grid 100, and thus the flow of the reactive power may reduce the stability of the electric power grid 100. When the AC generator 10 is in a standby mode or the like in which power thereof is not supplied, the AC filter circuit 13 does not need to filter the AC power. If such an AC filter circuit 13 is not necessary, the capacitor C1 may be disconnected from the electric power grid 100 side, and therefore, turning off the first switch 22 makes it possible to cut off the electrical path between the electric power grid 100 side and the capacitor C1 so that it is possible to suppress the reactive power from entering and leaving the capacitor C1.

It should be noted that, in addition to the so-called sub-switch opening method in which the capacitor C1 is separated from the circuit by the first switch 22 as described in the embodiment, the following two methods may be considered as countermeasures against reactive power. Another first method is a reactive power compensation method. Another second method is a main switch opening method. In the main switch opening method, the AC filter circuit 13 is disconnected from the electric power grid 100 by operating the AC circuit breaker 20. The main switch opening method has a disadvantage that the number of times of opening and closing of the AC circuit breaker 20 increases. On the other hand, the reactive power compensation method is a method of suppressing reactive power by performing reactive power compensation by controlling a power supply unit. The state of the power supply unit influences a performance to suppress reactive power. More specifically, when the power supply unit cannot generate power, for example, in the case of a photovoltaic power generation system at night, the reactive power compensation method cannot be used. In this regard, according to the sub-switch opening method of the embodiment, it is possible to promptly take reactive power countermeasures as necessary regardless of the state of the power supply unit, that is, the AC generator 10.

Embodiment 2

Figure 2:
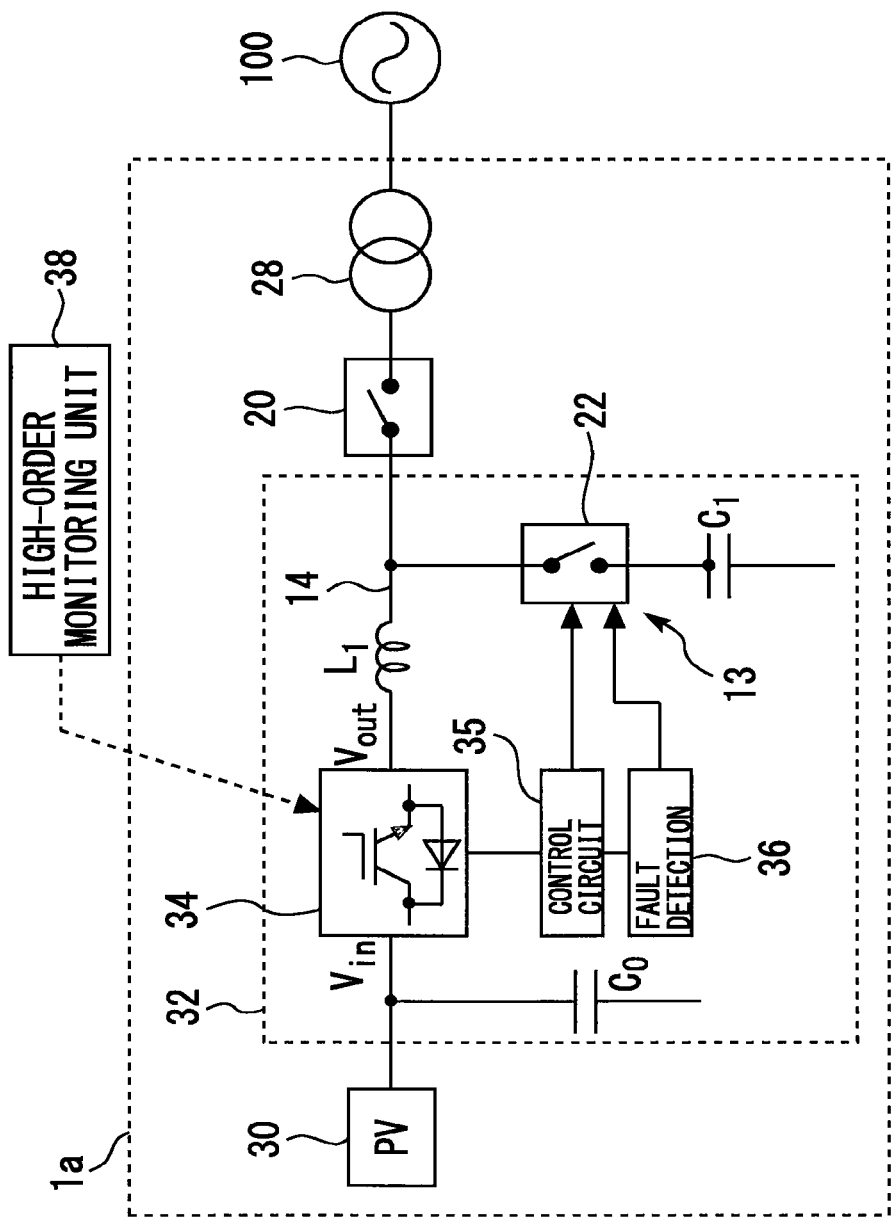
FIG. 2 is a circuit diagram showing a power conditioner and a power system according to an Embodiment 2 of the present invention.

FIG. 2 is a circuit diagram showing the power conditioner 32 and the power system 1a according to the Embodiment 2 of the present invention. The power system 1a according to the Embodiment 2 is a photovoltaic power generation system 1a. The photovoltaic power generation systems 1a consists of a photovoltaic cell array 30 which is a DC power supply, a power conditioner 32 connected to the photovoltaic cell array 30, the AC circuit breaker 20, and a transformer 28. As an example, the photovoltaic power generation system 1a according to the Embodiment 2 is also connected to a high-order monitoring device 38. The high-order monitoring device 38 is also connected to another photovoltaic power generation system (not shown). The other photovoltaic power generation system (not shown) has the same configuration as the photovoltaic power generation system 1a. The high-order monitoring device 38 is connected to the respective power conditioners 32 of the photovoltaic power generation system 1a and the other photovoltaic power generation system (not shown), and can collectively manage the photovoltaic power generation system 1a and the other photovoltaic power generation system (not shown).

The power conditioner 32 includes an inverter circuit 34, a control circuit 35 for controlling the inverter circuit 34, a failure detection circuit 36 for detecting a failure of the power conditioner 32, the AC filter circuit 13, and the first switch 22.

The inverter circuit 34 converts a DC voltage inputted from the photovoltaic cell array 30 into an AC voltage. The AC filter circuit 13 includes the inductor L1 and the capacitor C1 as in the Embodiment 1. One end of the inductor L1 is connected in series to the output end of the inverter circuit 34. The first switch 22 is interposed between the wiring 14 and one end of the capacitor C1. The first switch 22 can switch a state between the wiring 14 and the one end of the capacitor C1 between a connected state and a disconnected state. By opening the first switch 22 as necessary, it is possible to suppress the reactive power from entering and leaving the AC filter circuit 13 without opening the AC circuit breaker 20.

The control circuit 35 also functions as a determination unit for determining transition to the standby mode. The control circuit 35 determines whether or not the photovoltaic power generation system 1a shifts to a predetermined standby mode.

As specific examples of conditions under which a determination to shift to the standby mode is made, for example, the following first to fourth condition examples may be provided. As a first condition example, it may be determined that the standby mode condition is satisfied when the DC voltage outputted from the photovoltaic cell array 30 is lower than the predetermined lower threshold. As a second condition example, it may be determined that the standby mode condition is satisfied when the DC voltage outputted from the photovoltaic cell array 30 is higher than the predetermined upper limit threshold. As a third condition example, when the high-order monitoring device 38 managing the plurality of the photovoltaic power generation systems 1a is provided, it may be determined that the standby-mode condition is satisfied when the control circuit 35 receives from the high-order monitoring device 38 a signal whose active power command value is zero. As a fourth condition example, the following conditions may be used. When the failure of the power conditioner 32 is detected by the failure detection circuit 36, the inverter circuit 34 is placed in a gate block standby state. The gate block is to stop the operation of a power semiconductor element in the inverter circuit 34. As the fourth condition example, it may be determined that the standby mode condition is satisfied when the gate block standby is performed.

The power conditioner 32 turns off the first switch 22 when the determination unit determines a mode transition to the standby mode. More specifically, when at least one of the first to fourth condition examples of the standby mode transition condition is satisfied, the control circuit 35 or the failure detection circuit 36 may control the first switch 22 to the disconnected state.

The photovoltaic power generation system 1a according to the Embodiment 2 may be modified based on various known power supply systems. The power supply system may comprise a battery, a power converter having a charging mode for charging the battery and a discharging mode for converting DC power of the battery into AC power and outputting the AC power. The photovoltaic cell array 30 may be replaced with the battery and the power conditioner 32 may be replaced with the power converter. As the battery, various known secondary batteries, fuel cells, and the like may be used.

Embodiment 3

Figure 3:
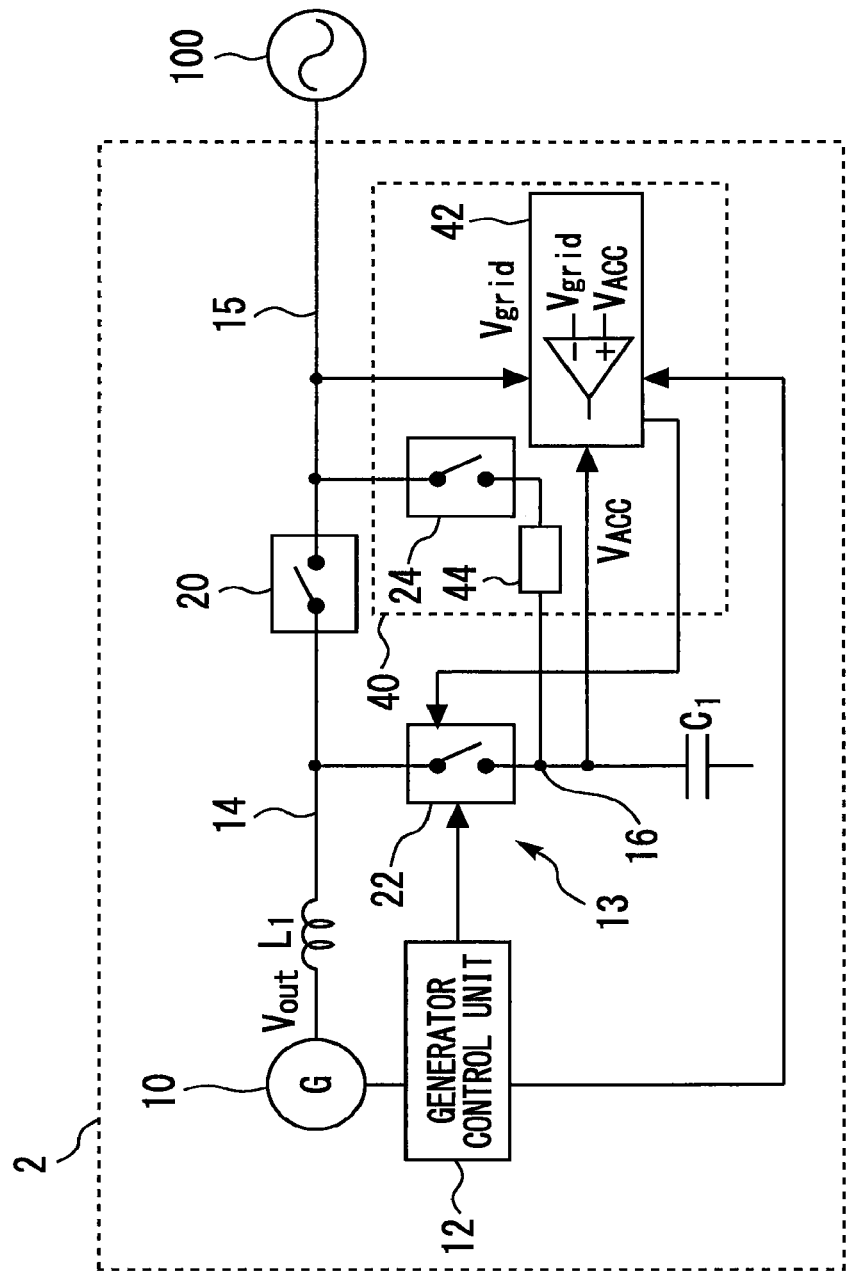
FIG. 3 is a circuit diagram showing a power system according to an Embodiment 3 of the present invention.

FIG. 3 is a circuit diagram showing a power system 2 according to an Embodiment 3 of the present invention. The power system 2 is obtained by adding a charging circuit 40 to the power system 1 according to the Embodiment 1. The charging circuit 40 can charge the capacitor C1 with a grid voltage $V_{grid}$ of the electric power grid 100.

The charging circuit 40 includes a second switch 24, a charging control circuit 42, and a current limiting unit 44. One end of the capacitor C1 and the first switch 22 are connected to each other at a connection point 16. The AC circuit breaker 20 and the electric power grid 100 are connected by the wiring 15. The second switch 24 is interposed between the connection point 16 and the wiring 15. The second switch 24 can switch a state between the connection point 16 and the wiring 15 between the connected state and the disconnected state.

The current limiting unit 44 suppresses high voltage of the electric power grid 100 from being applied to one end of the capacitor C1. The current limiting unit 44 may be a resistor, a constant current circuit, or the like. The current limiting unit 44 can adjust a current flowing into one end of the capacitor C1.

The charging control circuit 42 can switch each of the first switch 22 and the second switch 24 between the connected state and the disconnected state by providing a control signal to the first switch 22 and the second switch 24. The grid voltage $V_{grid}$ of the electric power grid 100 and the voltage $V_{ACC}$ of the capacitor C1 are inputted to the charging control circuit 42. The charging control circuit 42 includes a comparator therein. The comparator in the charging control circuit 42 can generate an output corresponding to the difference between the grid voltage $V_{grid}$ and the voltage $V_{ACC}$. The charging control circuit 42 can make the second switch 24 the connected state to charge the capacitor C1.

Figure 4:
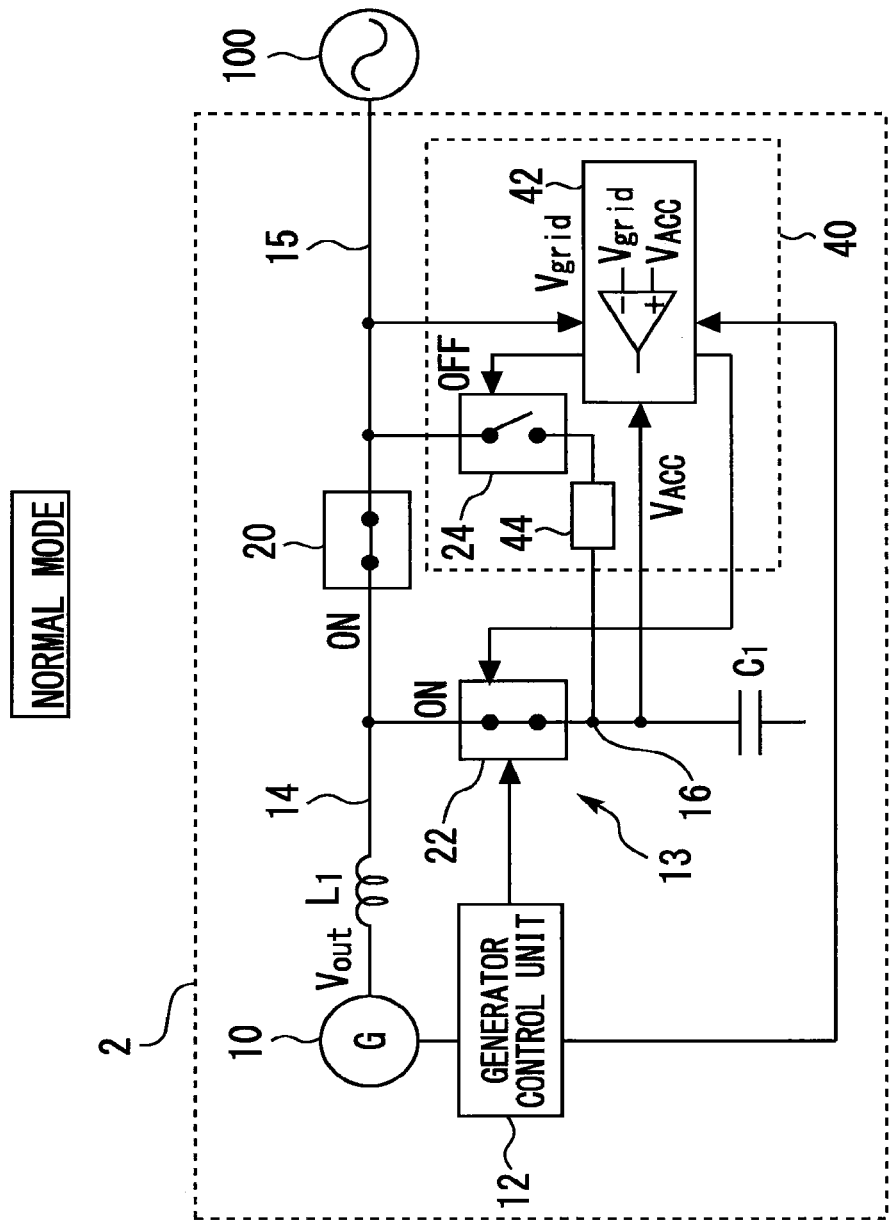
FIG. 4 is a circuit diagram for explaining the normal operation of the power system according to the Embodiment 3 of the present invention.

Next, operations of the power system 2 and the charging circuit 40 according to the Embodiment 3 will be described with reference to FIGS. 4 to 6. FIG. 4 is a circuit diagram for explaining normal operation of the power system 2 according to the Embodiment 3 of the present invention. When the power system 2 is in the normal operation, the AC generator 10 is operated steadily, and the grid connection operation between the AC generator 10 and the electric power grid 100 is stably performed. During the normal operation, the AC circuit breaker 20 is ON, i.e. the connected state, the first switch 22 is ON, i.e. the connected state, and the second switch 24 is OFF, i.e. the disconnected state.

The power system 2 according to the Embodiment 3 shifts to the standby mode when a specific condition is satisfied. A specific example of the standby mode transition condition is as described in Embodiment 1.

Figure 5:
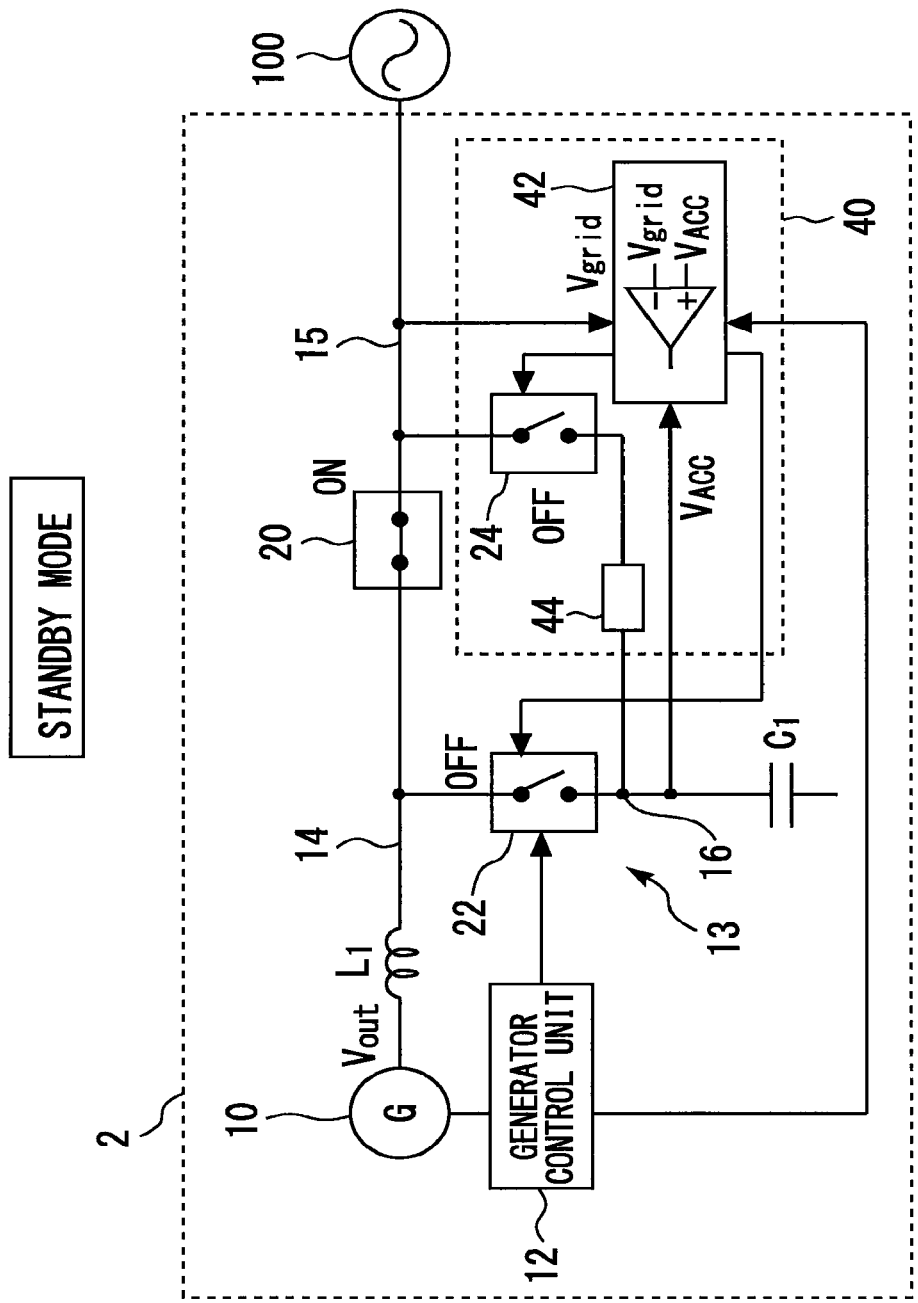
FIG. 5 is a circuit diagram for explaining a standby mode of the power system according to the Embodiment 3 of the present invention.

FIG. 5 is a circuit diagram for explaining a standby mode of the power system 2 according to the Embodiment 3 of the present invention. In the standby mode, the AC circuit breaker 20 is ON, i.e. the connected state, the first switch 22 is OFF, i.e. the disconnected state, and the second switch 24 is OFF, i.e. the disconnected state. When the first switch 22 is turned off, the electrical path between the electric power grid 100 side and the capacitor C1 can be cut off, so that it is possible to suppress the reactive power from entering and leaving the capacitor C1.

When the power system 2 returns from the standby mode to the normal operation, the first switch 22 should be made into the connected state so that the AC filter circuit 13 can perform its filter function. However, if the first switch 22 is turned off in accordance with the transition to the standby mode and thereafter the first switch 22 is switched to the connected state in a state in which the voltage of the capacitor C1 is low, there is a possibility that a rush current flows through the capacitor C1. Therefore, the power system 2 according to the Embodiment 3 is configured to charge the capacitor C1 as described below when returning from the standby mode to the normal operation.

Figure 6:
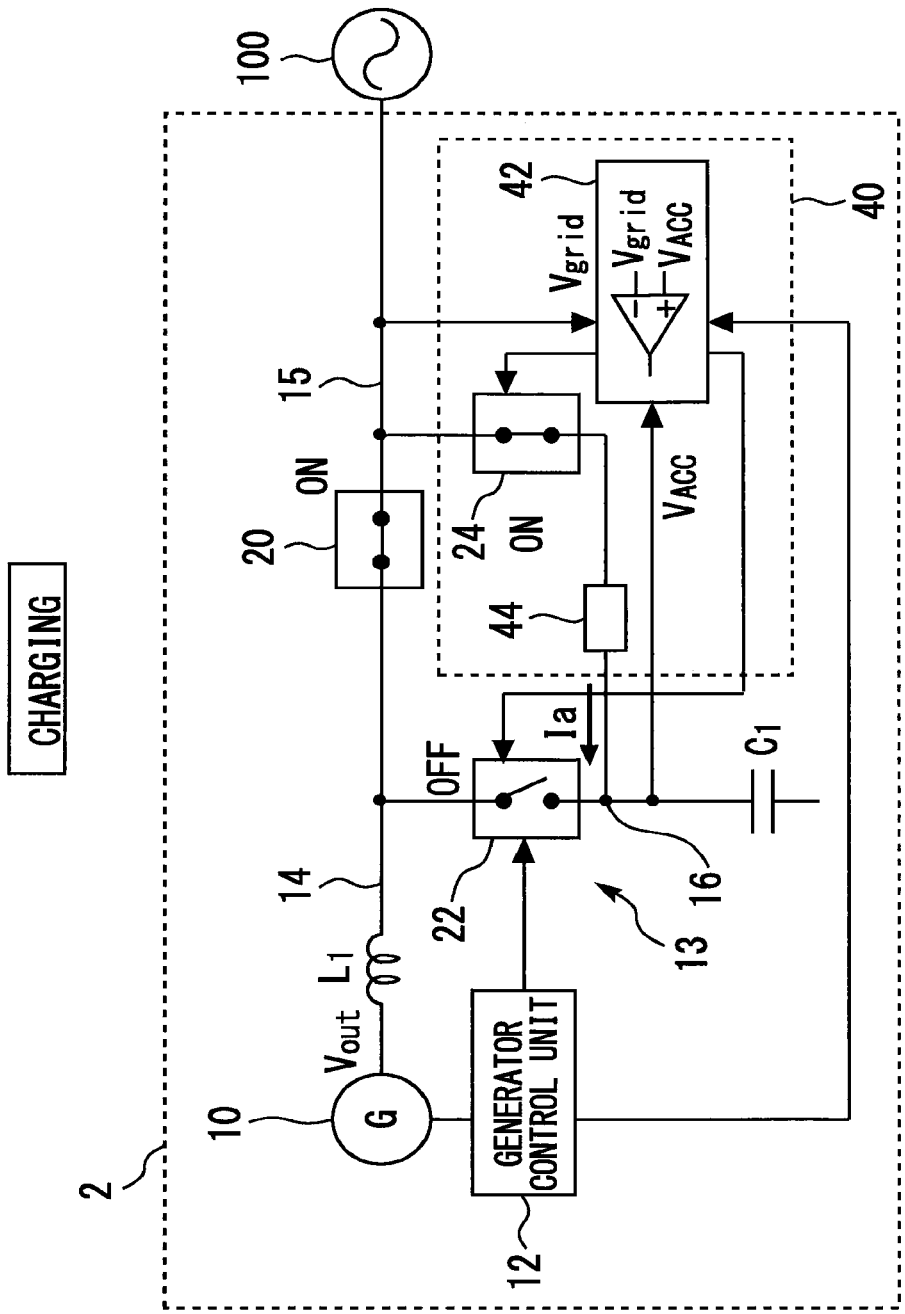
FIG. 6 is a circuit diagram for explaining a charging operation of the power system according to the Embodiment 3 of the present invention.

FIG. 6 is a circuit diagram for explaining an operation during charging of the power system 2 according to the Embodiment 3 of the present invention. When the AC generator 10 returns the AC power supply from the standby mode, a return notification signal is transmitted from the generator control unit 12 to the charging control circuit 42. The charging control circuit 42, upon receiving the return notification signal, first to make the second switch 24 the connected state. As a result, the charging current Ia flows, and the capacitor C1 is charged. When the difference between the voltage $V_{ACC}$ of the capacitor C1 and the grid voltage $V_{grid}$ of the electric power grid 100 becomes equal to or less than a first predetermined value, the charging control circuit 42 determines that the capacitor C1 has been sufficiently charged. When it is determined that the capacitor C1 has been sufficiently charged, the charging control circuit 42 switches the second switch 24 to the disconnected state, and then switches the first switch 22 from the disconnected state to the connected state.

By charging the capacitor C1 using the charging circuit 40 and then making the first switch 22 the connected state, it is possible to suppress a rush current from flowing through the capacitor C1. The film capacitor has an advantage that the problem of inrush current is small. On the other hand, since the oil capacitor needs to take inrush current into consideration, it is more preferable to provide the charging circuit 40 when the oil capacitor is used as the capacitor C1. As described above, during the charging shown in FIG. 6, the AC circuit breaker 20 is ON, i.e. the connected state, the first switch 22 is OFF, i.e. the disconnected state, and the second switch 24 is ON, i.e. the connected state.

A modification of the Embodiment 3 will be described. It should be noted that, although the charging control circuit 42 is connected to the first switch 22 in the Embodiment 3, the charging control circuit 42 may not be connected to the first switch 22 as a modification. In this case, the charging control circuit 42 exchanges a signal with the generator control unit 12 to charge the capacitor C1 when the AC generator 10 returns the AC power supply from the standby mode, and when the charging of the capacitor C1 becomes sufficient, the second switch 24 is turned off and a charging completion signal is sent to the generator control unit 12. In response to the charging completion signal, the generator control unit 12 switches the first switch 22 to the connected state and starts the power supply by the AC generator 10.

As another modification, when the AC generator 10 returns from the standby mode to the AC power supply mode and the difference between the voltage $V_{ACC}$ of the capacitor C1 and the grid voltage $V_{grid}$ is sufficiently small, the capacitor C1 can be omitted from being charged. That is, when it is determined that the difference between the voltage $V_{ACC}$ and the grid voltage $V_{grid}$ is equal to or less than a predetermined second predetermined value, the charging control circuit 42 according to the modification makes the first switch 22 the connected state without charging the capacitor C1. When it is determined that the difference between the voltage $V_{ACC}$ and the grid voltage $V_{grid}$ is larger than the second predetermined value, the charging control circuit 42 according to the modification charges the capacitor C1 by making the second switch 24 the connected state. The second predetermined value may be set to the same value as the first predetermined value, or may be set to a value larger or smaller than the first predetermined value.

Embodiment 4

Figure 7:
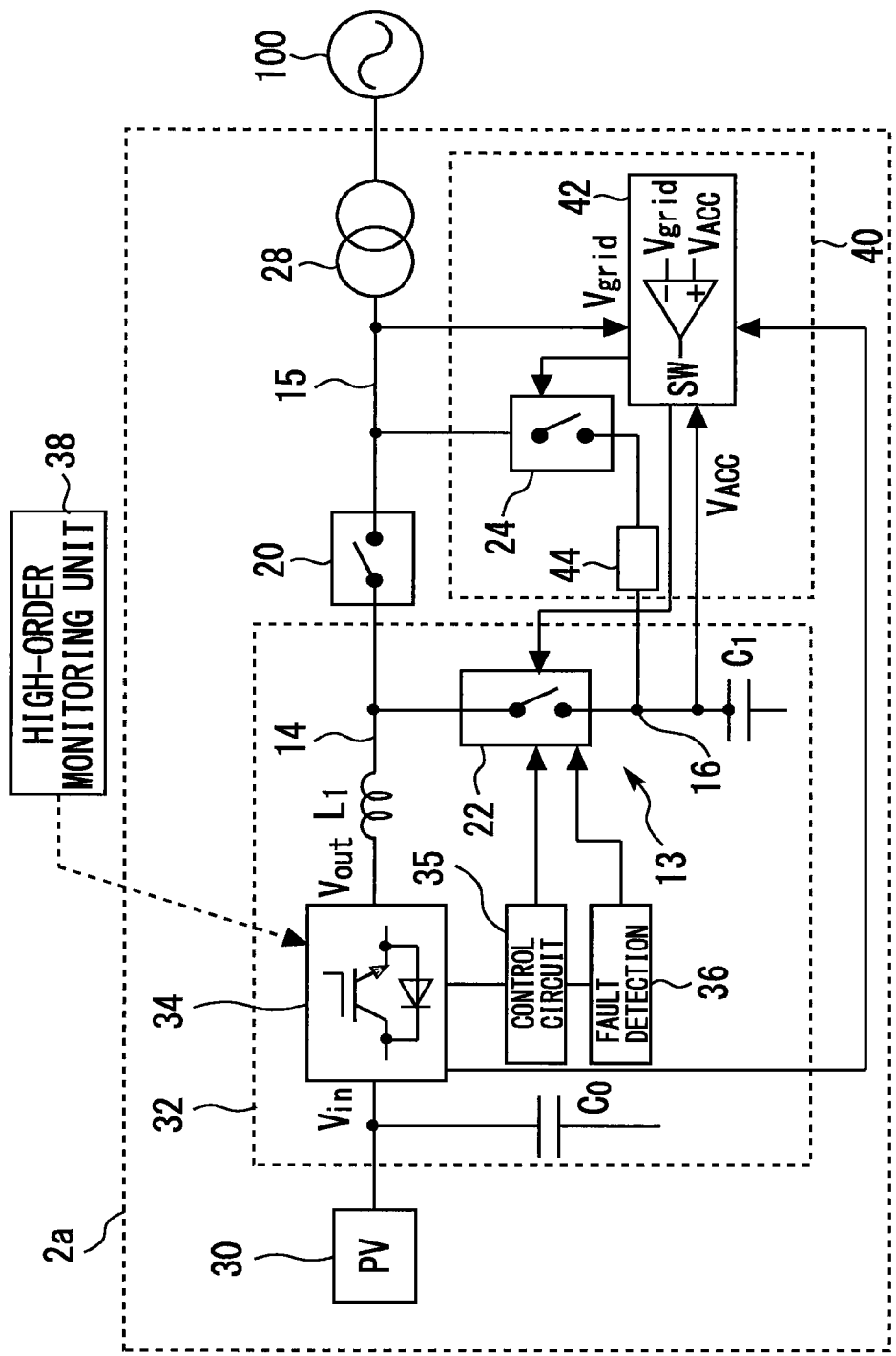
FIG. 7 is a circuit diagram showing a power conditioner and a power system according to an Embodiment 4 of the present invention.

FIG. 7 is a circuit diagram showing the power conditioner 32 and the power system 2a according to the Embodiment 4 of the present invention. The power system 2a according to the Embodiment 4 is obtained by adding the charging circuit 40 described in the Embodiment 3 to the photovoltaic power generation system 1a according to the Embodiment 2. The operation of the charging circuit 40 is the same as that of the Embodiment 3, and the configuration other than the charging circuit 40 is the same as that of the Embodiment 2, and therefore detailed description thereof is omitted.

The power system according to Embodiments 1 to 4 may be provided as a reactive power suppression method. In the reactive power suppression method according to the Embodiments 1 to 4, the electrical connection between the one end of the capacitor C1 and the wiring 14 connecting the other end of the inductor L1 and the AC circuit breaker 20 is switched between the connected state and the disconnected state using the first switch 22. In the reactive power suppression method according to Embodiments 1 to 4, when the first switch 22 is in the disconnected state, the first switch 22 may be switched from the disconnected state to the connected state after the capacitor C1 is charged using the charging circuit 40. The first switch 22 may be added to an existing power system, and the charging circuit 40 may be further added. Such post-addition also implements the reactive power suppression method according to Embodiments 1 to 4.

REFERENCE SIGNS LIST 1, 2 Power system
1a, 2a Photovoltaic power generation system (power system)
10 AC generator (AC power supply)
12 Generator control unit
13 AC filter circuit
14, 15 Wiring
16 Connection point
20 AC circuit breaker
22 First switch
24 Second switch
28 Transformer
30 Photovoltaic cell array
32 Power conditioner
34 Inverter circuit
35 Control circuit
36 Fault detection circuit
38 High-order monitoring device
40 Charge circuit
42 Charging control circuit
44 Current limiting unit
100 Electric power grid
Ia Charging current
$V_{grid}$ Grid voltage

The invention claimed is:

1. A power system comprising:
an AC power supply;
an AC filter circuit including an inductor having a first end and a second end, the first end being connected in series to an output end of the AC power supply, and a capacitor having a third end receiving a voltage at the second end of the inductor;
an AC circuit breaker provided between the second end of the inductor and an electric power grid; and
a first switch provided between the third end of the capacitor and a first wiring connecting the second end of the inductor and the AC circuit breaker;
a controller for switching the first switch from a connected state to a disconnected state while the AC circuit breaker remains connected when the AC power supply is operated in a predetermined standby mode;
a second switch provided between a connection point and a second wiring, the connection point connecting the third end of the capacitor and the first switch, and the second wiring connecting the AC circuit breaker to the electric power grid; and
a charging control circuit configured to make the second switch the disconnected state during the standby mode, to make the second switch the connected state while the first switch is in the disconnected state when the AC power supply returns from the standby mode to operation, and to make the second switch the disconnected state and make the first switch the connected state when the difference between a first voltage value of the electric power grid and a second voltage value of the capacitor is equal to or less than a predetermined first predetermined value.

2. The power system according to claim 1, wherein the charging control circuit is configured to make the first switch the connected state without making the second switch the connected state when the charging control circuit determines that the difference between the first voltage value and the second voltage value is equal to or less than a second predetermined value when the AC power supply returns from the standby mode to the operation, the second predetermined value being smaller than the first predetermined value.

3. The power system according to claim 1,
wherein the AC power supply is a generator, and
wherein the controller includes a generator control unit for controlling the generator.

4. A power conversion device comprising:
an inverter circuit converting a DC voltage from a DC power supply into an AC voltage;
an AC filter circuit including an inductor having a first end and a second end, the first end being connected in series to an output end of the inverter circuit and a capacitor having a third end receiving a voltage at the second end of the inductor; and
a first switch connecting the third end of the capacitor to a first wiring, the first wiring connecting the second end of the inductor to an AC circuit breaker provided between the second end of the inductor and an electric power grid, the first switch being provided between the first wiring and the third end of the capacitor;
a control circuit for making the first switch the disconnected state when it is determined that a power system including the DC power source and the inverter circuit shifts to a predetermined standby mode;
a second switch provided between a connection point and a second wiring, the connection point connecting the third end of the capacitor and the first switch, and the second wiring connecting the AC circuit breaker to the electric power grid; and
a charging control circuit configured to make the second switch the disconnected state during the standby mode, to make the second switch the connected state while the first switch is in the disconnected state when the power system returns from the standby mode to operation, and to make the second switch the disconnected state and make the first switch the connected state when the difference between a first voltage value of the electric power grid and a second voltage value of the capacitor is equal to or less than a predetermined first predetermined value.

5. The power conversion device according to claim 4,
wherein the charging control circuit is configured to make the first switch the connected state without making the second switch the connected state when it is determined that the difference between the first voltage value and the second voltage value is equal to or less than a second predetermined value when the power system returns from the standby mode to the operation, the second predetermined value being smaller than the first predetermined value.

6. The power conversion device according to claim 4,
wherein the DC power source includes a photovoltaic cell array,
wherein the first switch is an AC circuit breaker for use of wiring,
wherein a condition for shifting to the standby mode includes at least one of:
a first condition that a standby mode condition is satisfied when a DC voltage of the photovoltaic cell array is lower than a predetermined lower threshold value;
a second condition that the standby mode condition is satisfied when the DC voltage of the photovoltaic cell array is higher than a predetermined upper threshold value.

7. A method for suppressing reactive power of a power system comprising:

providing a power system including an AC power supply, an AC filter circuit having an inductor having a first end and a second end, the first end being connected in series to an output end of the AC power supply and a capacitor having a third end receiving a voltage at the second end of the inductor, and an AC circuit breaker provided between the second end of the inductor and an electric power grid; and switching a state between the third end of the capacitor and a first wiring connecting the second end of the inductor to the AC circuit breaker, between a connected state and a disconnected state by using a first switch; the method of suppressing reactive power in a power system further comprising:

switching the first switch from the connected state to the disconnected state while the AC circuit breaker remaining in the connected state when the AC power supply is operated in a predetermined standby mode;

making a second switch the disconnected state in the standby mode, the second switch being provided between a connection point and a second wiring, the connection point connecting the third end of the capacitor and the first switch, and the second wiring connecting the AC circuit breaker to the electric power grid;

charging the capacitor by making the second switch the connected state while making the first switch the disconnected state when the AC power supply returns from the standby mode to operation; and making the second switch the disconnected state and making the first switch the connected state after the charging of the capacitor, when the difference between a first voltage value of the electric power grid and a second voltage value of the capacitor becomes equal to or less than a predetermined first predetermined value.

8. The method for suppressing reactive power according to claim 7, further comprising:

making the first switch the connected state without making the second switch the connected state when the AC power supply returns from the standby mode to the operation if the difference between the first voltage value and the second voltage value is equal to or less than a second predetermined value, the second predetermined value being smaller than the first predetermined value.

\* \* \* \* \*